United States Patent [19]

Epperson et al.

[11] 4,415,608
[45] Nov. 15, 1983

[54] CONTINUOUS PRODUCTION OF POLYMETHYLPENTENE MEMBRANES

[75] Inventors: Bonnie J. Epperson; Lowell J. Burnett, both of San Diego, Calif.; Verne D. Helm, Plains, Mont.

[73] Assignee: UOP Inc., Des Plaines, Ill.

[21] Appl. No.: 339,812

[22] Filed: Jan. 15, 1982

[51] Int. Cl.³ ................................................ B32B 5/16
[52] U.S. Cl. ............................... 427/244; 156/244.24; 427/245; 427/359; 427/389.9; 427/434.4
[58] Field of Search ............ 427/359, 244, 245, 434.3, 427/434.4, 389.9; 264/41, 298, 49, 129; 156/246, 244.24; 55/524, 527, 528

[56] References Cited

U.S. PATENT DOCUMENTS

| | | | |
|---|---|---|---|
| 2,966,235 | 12/1960 | Kammermeyer | 183/115 |
| 3,526,588 | 9/1970 | Michaels et al. | 210/23 |
| 3,767,737 | 10/1973 | Lundstrom | 264/41 |
| 3,892,665 | 7/1975 | Steigelmann et al. | 210/490 |
| 4,132,824 | 1/1979 | Kimura et al. | 428/220 |
| 4,155,793 | 5/1979 | Salemme et al. | 156/246 |
| 4,267,215 | 5/1981 | Riggs | 427/428 X |
| 4,302,334 | 11/1981 | Jakabhazy et al. | 427/244 |

FOREIGN PATENT DOCUMENTS 1267167  3/1972  United Kingdom .

Primary Examiner—Thurman K. Page
Attorney, Agent, or Firm—James R. Hoatson, Jr.; Raymond H. Nelson; William H. Page, II

[57] ABSTRACT

Gas separation membranes may be prepared in a continuous manner by passing a porous support which may, if so desired, be backed by a fabric through a solution of polymethylpentene dissolved in an organic solvent such as hexane. The support member is passed through the solution while one side thereof is in contact with a roller, thereby permitting only one side of the support member to be coated with the polymer. After continuously withdrawing the support member from the bath, the solvent is allowed to evaporate and the resulting membrane is recovered.

10 Claims, No Drawings

CONTINUOUS PRODUCTION OF POLYMETHYLPENTENE MEMBRANES

The Government of the United States of America has rights in this invention pursuant to Contract No. DE-AC01-79CS40294 awarded by the United States Department of Energy.

BACKGROUND OF THE INVENTION

The use of semi-permeable membranes for reverse osmosis or ultrafiltration processes is well known. For example, in a reverse osmosis process, high pressure saline water may be placed in contact with a semipermeable membrane which is permeable to water but relatively impermeable to salt. Concentrated brine and relatively pure water are separated thereby; the water may then be utilized for personal use such as drinking, cooking, etc.

It has now been discovered that certain membranes may also be utilized for the separation of various gases. The separation of a gas mixture utilizing a membrane is effected by passing a feed stream of the gas across the surface of the membrane. Inasmuch as the feed stream is at an elevated pressure relative to the effluent stream, a more permeable component of the mixture will pass through the membrane at a more rapid rate than will a less permeable component. Therefore, the permeate stream which passes through the membrane is enriched in the more permeable component while, conversely, the residue stream is enriched in the less permeable component of the feed.

This ability to separate gases from a mixture stream will find many applications in commercial uses. For example, gas separation systems may be used for oxygen enrichment of air, for improved combustion efficiencies and conservation of energy resources. Likewise, nitrogen enrichment of air may be applicable where inert atmospheres are required. Other applications for oxygen enriched gases may be improving selectivity and efficiency of chemical and metallurgical processes. Similarly, inert atmospheres such as may be provided for by this invention may also be utilized in chemical and metallurgical processes. Some other applications of gas separation would include helium recovery from natural gas, hydrogen enrichment in industrial process applications, and scrubbing of acid gases. Specific uses for oxygen enrichment of air would be breathing systems for submarines and other underwater stations, improved heart-lung machines, and other lung assist devices. Another specific application of a gas separation system would be an aircraft to provide oxygen enrichment for life-support systems and nitrogen enrichment for providing an inert atmosphere for fuel systems. In addition, gas separation systems may be used for environmental benefits, e.g. methane can be separated from carbon dioxide in waste gases for sewage treatment processes and oxygen enriched air can be produced to enhance sewage digestion.

Some thin film polymers have been reported in the literature. For example, U.S. Pat. No. 3,892,665 discloses a membrane and a method for producing these membranes. In this patent, a thin polymer film is formed on the surface of a liquid, generally water, and is subsequently transferred to the surface of a porous supporting membrane. During the transfer of the thin polymer film, the porous support is maintained in a wetted stage with the liquid. In addition, the thin film can also be formed on the surface of the porous membrane if the surface of the support is first wet with the transfer liquid. This then means that the pores of the support member must be filled with liquid and, therefore, the liquid must be removed from the porous support at a period subsequent to the formation of the film in order to draw the film onto the support. In general, the thin polymer film of the reference consists of a monomolecular layer which is formed on the surface of the water wherein the individual film-forming monomer and/or polymer chains are oriented and closely packed. Subsequently, the oriented monomolecular layer or film, which is limited to a thickness in the range of from about 5 to about 25 Angstroms, is transferred to the surface of the porous support membrane. This process may be repeated until multiple monolayers are deposited on the surface of the support, the total film thickness then being from about 10 to about 200 Angstroms. Other than Van Der Vaal's forces, there is no bonding between the aggregate layers and the support. This means that the thin film of the finished membrane is weakly attached to the porous support and said membrane cannot withstand substantial back pressure when in operation. Obviously, this process is tedious and expensive and is not readily amenable to commercial use.

Another U.S. patent, namely U.S. Pat. No. 3,526,588, discloses a macromolecular fractionation process and describes a porous ultrafiltration membrane which is selective on the basis of pore size. In contradistinction to this, it is essential that the thin film membrane which is produced according to the process of the present invention is non-porous, so that gas separation operates by a diffusion-solution mechanism of transport. U.S. Pat. No. 3,767,737 which discloses a method for producing casting of "ultra-thin" polymer membranes is similar in nature to U.S. Pat. No. 3,892,665 in that the thin film of the membrane is formed on the surface of a liquid and transferred to the surface of a porous support membrane. The thin film polymer will thus inherently possess a disadvantage ascribed to the membrane of the former patent in that it cannot withstand substantial back pressure when in operation. In addition, U.S. Pat. No. 2,966,235 discloses a separation of gases by diffusion through silicone rubber which is not composited on a porous support material.

U.S. Pat. No. 4,155,793 involves a continuous method for the preparation of membranes by applying a polymer to a microporous support. However, the method of production described in this patent involves the spreading of a polymer casting solution onto the surface of a liquid substrate. The polymer which is utilized is not soluble in the liquid substrate nor is the solvent which is used compatible with the microporous support. The polymer film which constitutes the membrane is formed on the surface of the liquid and is thereafter applied to the microporous support. U.S. Pat. No. 4,132,824 discloses an ultra thin film of a polymer composite which comprises a blend of a methylpentene polymer and an organopolysiloxane-polycarbonate interpolymer for a thickness less than about 500 angstroms in which the interpolymer is present in an amount of up to about 100 parts by weight per 100 parts by weight of the methylpentene polymer. Likewise, U.S. Pat. No. 4,192,824 describes a method for preparing the aforementioned interpolymer by depositing on the surface of a liquid casting substrate a casting solution which comprises a mixture of methylpentene polymer and from 0 to 100 parts by weight of an organopolysiloxane-polycarbonate co-polymer. The casting solution spreads over the surface of the liquid casting substrate to form a thin film following which at least a portion of the thin film is removed from the surface of the substrate. Thereafter, the film may be used in contact with a porous support as a gas separation membrane.

As hereinbefore set forth, the separation of various gases from a mixture thereof may constitute an important advance in commercial applications. This is becoming increasingly important in view of the necessity to conserve energy. A particular application would relate to increasing the thermal efficiency of combustion processes when utilizing fossil fuels in commercial combustion applications. Also by utilizing a gas separation membrane in coal gasification, it may be possible to provide an oxygen enrichment of air for the production of low and medium British Thermal Unit (BTU) product gases as well as an oxygen enrichment of air for the combustion of these gases. For example, by placing a gas membrane separation system in close proximity to both gas production and gas combustion facilities, it would allow a site-located oxygen enrichment plant to supply both processes without the additional expense of transporting the gas or duplicating enrichment facilities.

SUMMARY OF THE INVENTION

It is therefore an object of this invention to provide a process for preparing membranes which are utilized in the separation of gases.

A further object of this invention is to provide a process for the preparation of membranes which comprise a thin film of a semi-permeable material composited on a porous support member, said membranes being utilized for the separation of various gas components contained in a mixture thereof.

In one aspect, an embodiment of this invention resides in a process for the continuous production of a polymethylpentene membrane which comprises dissolving said polymethylpentene in an organic solvent, placing the resultant solution in a container, continuously passing a microporous support into said container and through said solution, said support being in contact on one side thereof with a moving roller whereby only one side of said support is in contact with said solution, continuously withdrawing the resulting polymer-coated support from said container, evaporating said solvent and continuously recovering the resultant polymethylpentene membrane.

A specific embodiment of this invention is found in a process for the continuous production of a polymethylpentene membrane which comprises dissolving said polymethylpentene in n-hexane, placing the resultant solution in a container, continuously passing a microporous support backed by a polyester into said container at ambient temperature and atmospheric pressure and through said polymethylpentene-n-hexane solution, said support being in contact on one side thereof with a moving roller whereby only one side of said support is in contact with the polymethylpentene-n-hexane solution, continuously withdrawing the resulting polymethylpentene-coated support from said container, evaporating said n-hexane, and continuously recovering the resultant polymethylpentene membrane.

Other objects and embodiments may be found in the following further detailed description of the present invention.

DETAILED DESCRIPTION OF THE INVENTION

As hereinbefore set forth, the present invention is concerned with a process for producing a membrane which may be utilized in the separation of gases, said membrane consisting of a finely permeable barrier composited on a finely porous support member which, if so desired, may be backed by a fabric. By utilizing an imperfection-free semi-permeable barrier which has been prepared from polymethylpentene, the selected gas or gases will pass through the barrier with little hindrance, while other gases will be less able to penetrate the barrier. In the preferred embodiment of the invention, the semi-permeable barrier will possess a thickness ranging from about 500 to about 13,000 Angstroms, the preferred range being from about 500 to about 3,000 Angstroms. The thickness of the film may be controlled by the concentration of the polymeric film-forming material in the solution as well as the rate of withdrawal of the porous support member from the solution. Examples of porous support membranes which may be utilized will comprise such supports as polysulfone, cellulose nitrate, cellulose acetate, etc. If so desired, this porous support member may be impregnated on a fabric which acts as a backing therefor, said backing member being either natural or synthetic in origin and either woven or non-woven in configuration. Some specific examples of these backing members will include natural fabrics such as canvas, cotton, linen, etc., or a synthetic fabric such as polyester, either woven or non-woven in configuration, dacron, nylon or orlon, etc. In the preferred embodiment of the invention, the finely porous support member will possess a thickness ranging from about 50 to about 200 microns.

The membranes for the separation of gases in the present invention are prepared by continuously forming the thin layer of polymethylpentene directly on the finely porous surface of the supporting membrane by continuously passing one surface of the supporting membrane through a solution which contains the finely permeable membrane-forming polymer. As hereinbefore set forth, the thickness of the film is controlled by the concentration of the polymethylpentene in the solution as well as by the rate of withdrawal of the supporting member from the solution. By utilizing this method of asymmetric membrane preparation, it is possible to achieve several additional degrees of freedom beyond that which is possible when preparing a membrane according to more conventional methods. Some examples of these advantages will include an independent selection of materials constituting the finely porous supporting membrane; and independent preparation of the thin film and the porous supporting membrane whereby it is possible to optimize each component for its specific function; a reproductive variation and control over the thickness of the semi-permeable barrier which is required to attain the theoretical maximum in performance; control over the porosity and perfection of the semi-permeable barrier that is necessary to attain the theoretical semi-permeability of the material; and the formation of the film directly on the finely porous surface of the support whereby said film is integrally bonded to the support member, thus permitting the finished membrane to withstand any back pressure which may be encountered in normal operation.

As an illustration, but not necessarily limiting the gas separation membrane, a finely porous support membrane may be prepared by casting the support on a casting machine from which a solution which contains the support material such as cellulose nitrate and cellulose acetate or polysulfone, as well as solvents such as organic materials including ketones such as acetone, methyl ethyl ketone, diethyl ketone, methyl propyl ketone, etc., alcohols such as methyl alcohol, ethyl alcohol, n-propyl alcohol, isopropyl alcohol, n-butyl alcohol, dimethylformamide, etc., and surfactants to increase the wettability of the components of the solution. The solution, after blending the various components thereof, is filtered to remove any foreign material by passing through a filter medium under superatmospheric pressure usually afforded by the presence of nitrogen, and thereafter is degassed to remove any dissolved inert gas, such as nitrogen. The solution is fed onto the casting belt and spread on said belt at a desired thickness by means for controlling the thickness such as a casting knife. The freshly cast solution is carried on the belt into a gelation chamber which is maintained at a slightly elevated temperature in the range of from about 30° to about 40° C. After passage through this first gelation chamber wherein the surface pores, size and permeability of the membrane is controlled, the belt and support membrane are passed into a second gelation chamber in which the properties of the membrane are fixed. The temperature of the second gelation chamber is higher than that of the first gelation chamber in order to promote the removal of the solvents which may be present. After passing from the second gelation chamber, the membrane is removed from the casting belt and passed to storage.

The gas separation membrane which comprises the desired product may then be prepared by continuously passing one of the finely porous surfaces of the support member, the material which, if so desired, may be backed by a fabric of the type hereinbefore set forth, through a solution which contains the polymethylpentene dissolved in an appropriate solvent. The polymeric solution may be prepared by dissolving the polymethylpentene in an appropriate solvent which may comprise a paraffinic hydrocarbon, either aliphatic or cyclic in nature such as n-pentane, n-hexane, n-heptane, cyclohexane, cycloheptane, methylcyclohexane, etc., aromatic hydrocarbons such as benzene, toluene, zylene, ethylbenzene etc., or halogenated hydrocarbons such as chloroform, iodoform, bromoform, carbon tetrachloride, carbon tetraiodide, carbon tetrabromide, tetrachloroethane, tetrabromoethane, difluorodichloroethane, trichloroethane, trifluoroethane, trifluorotrichloroethane, etc. The particular organic solvent which is employed in the process of this invention will comprise the type of solvent which will dissolve the semipermeable membrane-forming polymethylpentene, but will not be of the type which will dissolve or solubilize the support member. Thus, it is apparent that the particular solvent which is employed will depend upon both the polymethylpentene and the particular support member which is to be employed.

The polymethylpentene will be present in the solution in a range of from about 0.5 to about 5% by weight of said solution, the amount of polymethylpentene present in the solution being dependent upon the desired thickness of the semi-permeable membrane to be prepared. The solution is placed in a container or apparatus which is provided with a roller extending into the solution, but is not completely immersed therein. The microporous support member is continuously passed into the solution containing the polymethylpentene in such a manner so that the support travels under the roller, one side of said support being in contact with the roller. Inasmuch as one side of the support member is in contact with the roller, only one side of the support member is contacted with the solution. The feed of the support member through the solution and rate of withdrawal may range from about 0.5 to about 5.0 feet per minute, said rate being dependent upon the thickness of the film which is desired to coat the support member. After continuously withdrawing the polymer-coated support member from the solution, the solvent is evaporated either by natural drying at ambient temperature or, if so desired, the evaporation may be accelerated by utilizing the application of heat from an external source to the surface of the polymer-coated support member. Thereafter, the resultant gas separation membrane is passed to storage.

The gas separation membranes which have been prepared according to the process herein described may be used in any separation devise known in the art. For example, the devices may be used in either single stage or multi-stage membrane plants. One type of configuration in which the gas membrane may be used would comprise a spiral wound element. In this type of element, two sheets of semi-permeable membrane are separated by a porous supporting material which both supports the membrane against the operating pressure and provides a flow path for the gaseous output. The membranes are sealed around three edges or sides to prevent contamination of the product gases, while the fourth edge or side is sealed to the product tube. The product tube is provided with perforations inside the edge seal area in order that the product gases can be removed from the porous support material. The resulting configuration is in the form of an envelope which is rolled up about the central tube in the form of a spiral along with a mesh spacer which separates the facing surface membranes. By utilizing such a type of element, it is possible to take advantage of a number of factors which include, among others, a large membrane surface area per unit volume and a convenient and simple pressure vessel design and configuration, which in turn will lead to a compact module plant arrangement, flexibility and ease in installation and in replacement of the elements inasmuch as the modules may comprise two or several disposable units connected in series.

As was hereinbefore set forth, by utilizing the process of the present invention, it is possible to obtain a membrane in which the thin film which is composited on the porous support is not formed in a series of monomolecular layers nor are the molecules oriented or closely packed, the polymer chains being intertwined and loosely arranged so as to form an amorphous film. As a result of this method of preparing finished membrane, the thin film membrane is formed on the surface of the porous support member directly from solution and is integrally bonded to the support membrane, thus permitting a high gas permeation through the membrane. In contradistinction to the membranes which were found in prior U.S. patents, the membrane prepared according to the process of this invention does not require multiple, thin film layers in order to attain the desired thickness. The polymethylpentene which is utilized in the process of the present invention will possess a molecular weight which is sufficient to prevent the material from penetrating the pores on the surface of the porous support. Furthermore, the gas separation membranes which are formed according to the process of the present invention, due to the integral bonding of the thin film membrane to the porous support, will withstand any back pressure which may be encountered during the gas separation process.

The following examples are given to illustrate the continuous process of the present invention for producing gas separation membranes in which polymethylpentene is directly composited on the surface of the support from a solution containing the same. However, it is to be understood that these examples are given merely for purposes of illustration, and that the present invention is not necessarily limited thereto.

EXAMPLE I

In this example, 0.012 gram of polymethylpentene were dissolved in about 12 grams of hexane to form a solution containing 1% by weight of the polymethylpentene. The resulting solution was placed in an aluminum dip tank provided with an aluminum roller 3" in length. A strip of polysulfone 3" in width was continuously passed through the solution in such a manner so that one surface of the polysulfone was in contact with the aluminum roller, said immersion being effected at ambient temperature and atmospheric pressure. The polysulfone was fed to the solution and withdrawn at a rate of about 4 feet per minute. The polysulfone support which contained the polymethylpentene on only one surface thereof was recovered and the hexane was allowed to evaporate at a temperature of 25° C. A sample of the gas separation membrane which comprised the polymethylpentene polymer, coated on one side of the polysulfone support was recovered and tested, said membrane having a thickness of 6,000 Angstroms.

To illustrate the efficiency of the membrane, the membrane prepared according to the above paragraph was used in a single stage gas separation process. A feed stream comprising air was passed over the surface of this membrane at a pressure of 20 psi and 25° C. The membrane exhibited a higher permeability to oxygen than to nitrogen, thus higher oxygen flows were measured for oxygen than for nitrogen.

EXAMPLE II

In a manner similar to that set forth in Example I above, a solution was prepared by dissolving 0.34 gram of polymethylpentene in 33.66 cc of n-hexane to afford a solution containing 1% by weight of polymethylpentene. The solution was placed in a 6 inch dip tank made of aluminum provided with a one inch diameter roller which was 6 inches in length. A strip of polysulfone 6 inches in width was continuously passed through the solution and withdrawn at a rate of 3 feet per minute. The polysulfone support member, while passing through the solution, had one surface thereof in contact with the roller so that only the other surface of the support was contacted with the polymer-containing solution. After withdrawal from the solution, the polymethylpentene-coated member was recovered and the hexane solvent was allowed to evaporate. Again, as in Example I, the gas separation membrane which had a thickness of 4,800 Angstroms was tested in the following manner: A feed stream comprising oxygen or nitrogen was passed over the surface of the membrane at a pressure of 20 psi and 25° C. This membrane also exhibited a higher permeability to oxygen than to nitrogen and a higher flow rate was measured for oxygen. The separation factor which is the ratio of the oxygen to the nitrogen flow was 2.94.

EXAMPLE III

To illustrate the operability of membranes of varying thicknesses which had been prepared in a continuous manner by contacting a porous support member with a solution of polymethylpentene dissolved in heptane and hexane, a series of these membranes were prepared. The results of these preparations in which the membranes of varying thickness were tested in a single stage gas separation process are set forth in the following table:

| Solvent | Membrane Thickness | Selectivity |
| --- | --- | --- |
| Heptane | 10,567 | 3.87 |
|  | 12,571 | 4.31 |
| Hexane | 10,324 | 3.17 |
|  | 9,059 | 2.98 |
|  | 10,021 | 3.14 |
|  | 13,361 | 3.43 |
|  | 1,169 | 1.30 |
|  | 4,707 | 2.58 |
| Hexane | 3,079 | 2.28 |
|  | 546 | 1.25 |
|  | 3,212 | 2.33 |
|  | 6,044 | 2.94 |
| Heptane | 607 | 1.37 |
|  | 893 | 1.62 |
| Hexane | 1,469 | 1.36 |

EXAMPLE IV

In like manner, gas separation membranes in which the porous support is backed by a fabric such as a polyester, nylon, etc., may also be prepared by continuously passing the porous support backed by a fabric through a solution of polymethylpentene dissolved in an organic solvent such as pentane, hexane, heptane, etc. and allowing the solvent to evaporate from the polymer-coated support member, only one side of said support member being coated with the polyester.

We claim as our invention:

1. A process for the continuous production of a polymethylpentene membrane which comprises dissolving said polymethylpentene in an organic solvent, placing the resultant solution in a container, continuously passing a microporous support into said container and through and in direct contact with said solution, said support being in contact on one side thereof with a moving roller whereby only one side of said support is in contact with said solution, transferring polymethylpentene from said solution to said one side of the support, continuously withdrawing the resulting polymer-coated support from said container, evaporating said solvent and continuously recovering the resultant polymethylpentene membrane.

2. The process as set forth in claim 1 further characterized in that said porous support is backed by a fabric.

3. The process as set forth in claim 2 in which said fabric is a polyester.

4. The process as set forth in claim 2 in which said fabric is a nylon.

5. The process as set forth in claim 1 in which said polymethylpentene is present in said solution in an amount in the range of from about 0.5 to about 5% by weight of said solution.

6. The process as set forth in claim 1 in which said organic solvent comprises a paraffinic hydrocarbon.

7. The process as set forth in claim 6 in which said solvent is n-pentane.

8. The process as set forth in claim 6 in which said solvent is n-hexane.

9. The process as set forth in claim 6 in which said solvent is n-heptane.

10. The process as set forth in claim 1 in which the thickness of said polymethylpentene membrane is in a range of from about 3,000 Angstroms to about 12,000 Angstroms.

* * * * *